United States Patent
Chang

(10) Patent No.: US 10,207,341 B2
(45) Date of Patent: Feb. 19, 2019

(54) DISPOSABLE DRILLING AND MILLING CUTTER

(71) Applicant: Hsin-Tien Chang, Taichung (TW)

(72) Inventor: Hsin-Tien Chang, Taichung (TW)

(*) Notice: Subject to any disclaimer, the term of this patent is extended or adjusted under 35 U.S.C. 154(b) by 39 days.

(21) Appl. No.: 14/722,286

(22) Filed: May 27, 2015

(65) Prior Publication Data

US 2016/0175947 A1    Jun. 23, 2016

(30) Foreign Application Priority Data

Dec. 23, 2014  (TW) ............................. 103145034 A

(51) Int. Cl.
  *B23C 5/20*   (2006.01)
  *B23C 5/10*   (2006.01)

(52) U.S. Cl.
  CPC .............. *B23C 5/109* (2013.01); *B23C 5/207* (2013.01); *B23C 2200/206* (2013.01); *B23C 2210/02* (2013.01); *B23C 2210/0407* (2013.01); *B23C 2210/32* (2013.01); *B23C 2210/54* (2013.01); *B23C 2220/52* (2013.01); *B23C 2250/12* (2013.01)

(58) Field of Classification Search
  CPC ... B23C 5/109; B23C 5/207; B23C 2200/206; B23C 2210/02; B23C 2220/52; B23C 2250/12; B23C 2210/32; B23C 2210/0407; B23C 2210/54
  See application file for complete search history.

(56) References Cited

U.S. PATENT DOCUMENTS

| | | | | |
|---|---|---|---|---|
| 3,875,631 A * | 4/1975 | Malinchak | .............. | B23C 5/207 407/113 |
| 4,068,976 A * | 1/1978 | Friedline | ................. | B23C 5/207 407/114 |
| 7,040,844 B1 * | 5/2006 | Daiguji | .................. | B23C 5/109 407/113 |
| 8,740,510 B2 * | 6/2014 | Ishida | ...................... | B23C 5/06 407/113 |
| 2005/0244237 A1 * | 11/2005 | Kuenzel | ................ | B23B 51/048 408/59 |
| 2006/0263157 A1 * | 11/2006 | Yeh | .......................... | B23C 5/109 408/239 R |
| 2009/0249926 A1 * | 10/2009 | Serwuschok | ............. | B23B 5/18 82/1.11 |
| 2012/0039675 A1 * | 2/2012 | Men | ....................... | B23C 5/109 407/40 |
| 2014/0262534 A1 * | 9/2014 | Cox | ......................... | E21B 10/26 175/295 |

* cited by examiner

*Primary Examiner* — Sunil K Singh
*Assistant Examiner* — Paul M Janeski
(74) *Attorney, Agent, or Firm* — Rosenberg, Klein & Lee

(57) ABSTRACT

A disposable drilling and milling cutter for use with an NC or CNC machine tool and configured to be fed in a spiral manner includes a shank, a chip removing groove at one of a plurality of offset positions at one end of the shank, a blade seat at a distal end of the chip removing groove, and a disposable blade locked to the blade seat. The disposable blade has a cutting edge at each of its upper and lower ends, and each cutting edge has an irregular height and a notch. The wavy structural design of the disposable blade enables the disposable drilling and milling cutter to drill and mill in a sectioned manner, to break the drilling/milling chips automatically, and to perform intermittent processing.

10 Claims, 8 Drawing Sheets

DISPOSABLE DRILLING AND MILLING CUTTER

FIELD OF THE INVENTION

The present invention relates to an improved cutter capable of both drilling and milling. More particularly, the present invention relates to a disposable drilling and milling cutter for use with a numerical control (NC) or computer numerical control (CNC) machine tool and designed to be fed spirally in order to carry out drilling and milling.

BACKGROUND OF THE INVENTION

Referring to FIG. 10, the diameter ϕ d of a hole to be drilled into a workpiece by a conventional drill bit is determined by the diameter ϕ D of the drill bit, or more specifically, the diameter ϕ d is defined by the cutting edge(s) of the drill bit. Since drill bits of a certain size can only be used to drill holes of a specific diameter, one who has drilling needs must prepare and store a large number of drill bits of various sizes. In addition, it is well known in the art that a twist drill bit as shown in FIG. 10 produces continuous and wide drilling chips during operation, especially when drilling mild steel, aluminum, aluminum alloys, or stainless steel. Such continuous chips do not break easily, tend to be stuck in the chip removing grooves, and have high thermal conductivity such that the main shaft of the controller, e.g., a machine tool, is subjected to a huge cutting load which is typically as high as 60% of the load capacity of the main shaft, and which has significant adverse effects on not only the main shaft, but also the rigidity, cutting precision, and service life of the machine tool. Should the chips get stuck and make it impossible to keep on drilling, the drilling operation must be suspended until the chips are removed.

FIG. 11 shows a conventional disposable drill bit whose disposable blades are provided with chip breaking grooves. When the material being drilled is soft, however, the chip breaking grooves may have problem breaking the drilling chips, and the chips may eventually get stuck and cause overheating. To cool the drill bit, it is typically required to inject a cutting fluid at the drill bit, but if the hole being drilled is so deep that the chips produced hinder the cutting fluid from flowing into the hole and reaching the cutting edges at the distal end of the drill bit, the temperature of the cutting edges will continue rising. This explains why a conventional drilling operation must be conducted intermittently to allow chip removal and heat dissipation. Such intermittent operation nevertheless results in low work efficiency and high processing cost.

Both drill bits described above are configured for continuous cutting and generate large, continuous chips which tend to get stuck and raise overheating issues. Moreover, a twist drill bit as well as a disposable drill bit has limitations on drilling depth, for the greater the drilling depth, the more difficult it is to discharge the chips produced. If the chips are trapped in the drill bit flutes, further drilling will be obstructed.

SUMMARY OF THE INVENTION

As stated above, the conventional twist drill bits and the conventional disposable drill bits are designed for continuous cutting and generate large, continuous drilling chips that are very likely to get stuck and cause overheating. In addition, a conventional drill bit of a certain size can only drill holes of a specific diameter such that a user must prepare and store a good number of drill bits of different specifications. Besides, in view of drilling stability, one who is choosing a drill bit must take into account the ratio of drill bit diameter to drilling depth (D/L) and the drilling depth limit; otherwise, the drilling chips may be trapped in the drill bit flutes and keep the drill bit from working.

According to one aspect of the present invention, a disposable drilling and milling cutter to be controlled by an NC or CNC machine tool and fed in a spiral manner in order to perform both drilling and milling includes a shank, a chip removing groove at one of a plurality of offset positions at one end of the shank, a blade seat at a distal end of the chip removing groove, and a disposable blade locked to the blade seat. The disposable blade has a cutting edge at each of its upper and lower ends, and each of the cutting edges is irregular in height and notched.

Preferably, the disposable drilling and milling cutter works with a numerical control or computer numerical control machine tool and is fed in a spiral manner in order to drill and mill.

Preferably, the at least one of the cutting edges has a lead angle defining a spiral feed, and the lead angle is defined by a measuring line tangent to a curve of the cutting edge and extending through the notch.

Preferably, the lead angle defining the spiral feed is 25.8°.

Preferably, each of the cutting edges is provided at an end surface of the disposable blade, and each of the end surfaces is provided with a flat surface pressed against a side of the blade seat.

Preferably, the notch of the at least one of the cutting edges of the disposable blade is rectangular or trapezoidal.

Preferably, the shank is centrally provided with a water outlet hole in communication with the chip removing groove.

Preferably, the disposable blade has a blade body, the cutting edges are respectively formed at an upper end and a lower end of a top surface of the blade body, and the at least one of the cutting edges is provided with a plurality of said notches such that the cutting edge has a wavy shape and is formed with a series of alternately arranged outward edge sections and inward edge sections.

Preferably, two said disposable blades are provided, and the inward edge sections of the two disposable blades that are closest to a center of the shank are spaced by a spacing.

Preferably, the disposable drilling and milling cutter has an end provided with a connecting screw rod, and the connecting screw rod is connectable with an extension rod to increase a length of the disposable drilling and milling cutter.

Accordingly, a drilling and milling operation can be carried out by feeding the disposable drilling and milling cutter in a spiral manner under the control of a machine tool. Thanks to the spiral feeding approach and the wavy structural design of the disposable blade, the cutting edges of the disposable blade can drill and mill in a sectioned fashion, break the drilling/milling chips automatically, and perform intermittent processing. Consequently, the drilling/milling chips are short and small, can be easily discharged without getting stuck, allow fast heat dissipation, and can prevent a build-up of cutting resistance for a higher cutter rotational speed and higher material removal rate. In addition, the drilling and milling cutter can be used in combination with an extension rod to make deep holes.

DETAILED DESCRIPTION OF THE INVENTION

Figure 1:
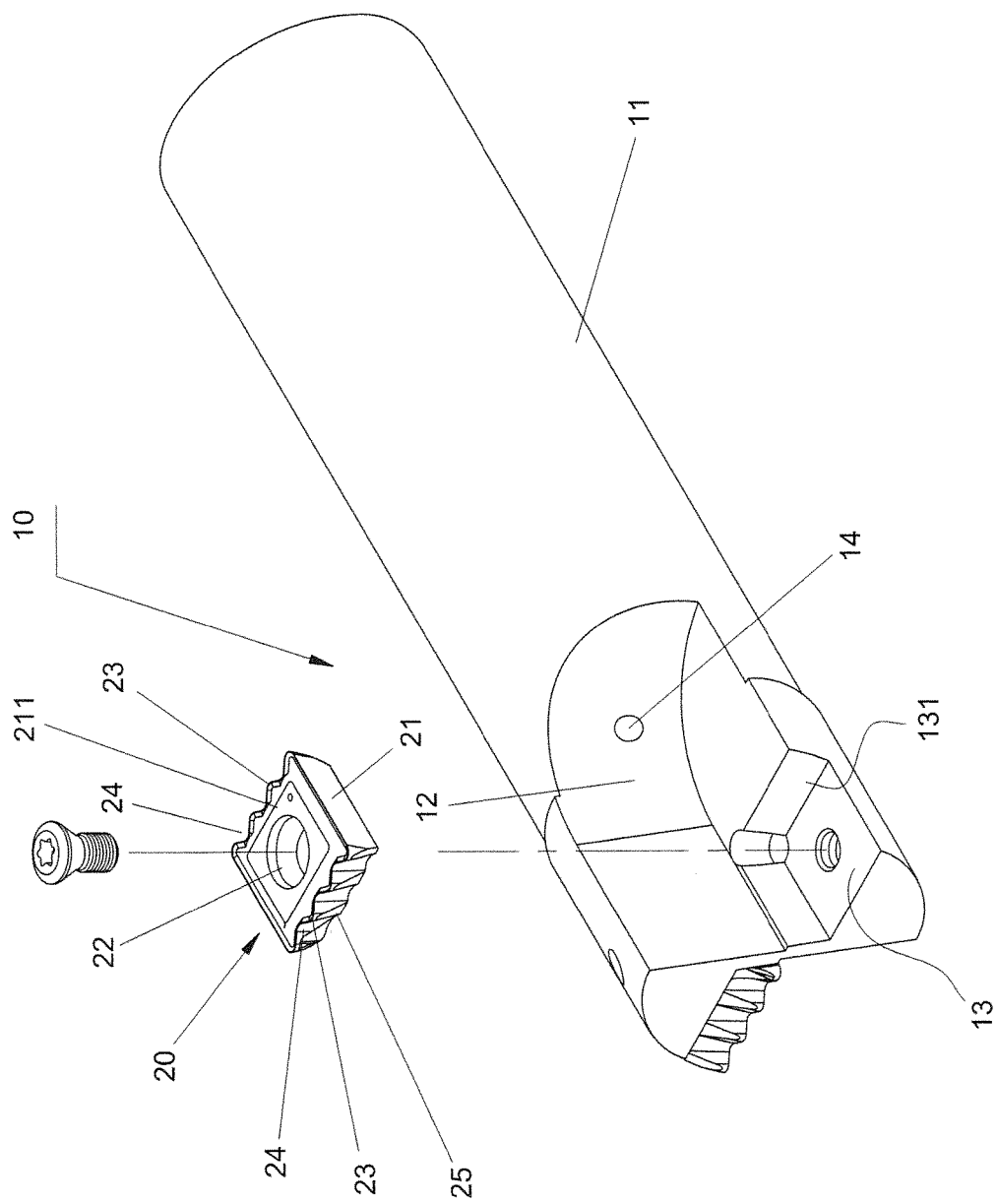
FIG. 1 is an exploded perspective view of the disposable drilling and milling cutter in an embodiment of the present invention.
Figure 2:
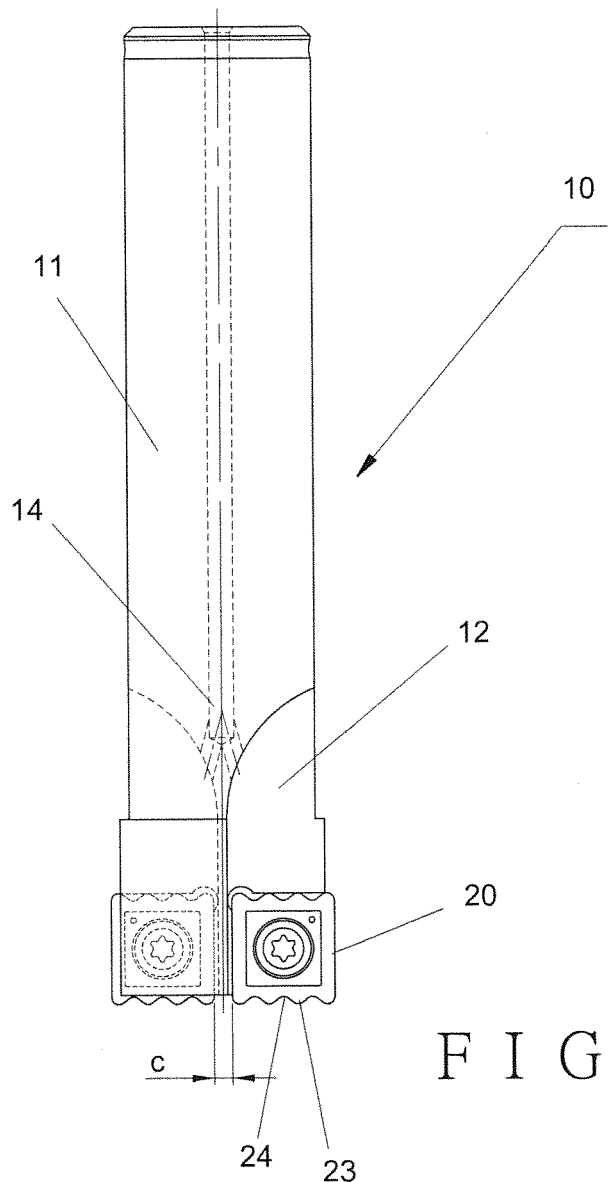
FIG. 2 is a front view of the disposable drilling and milling cutter in FIG. 1.
Figure 3:
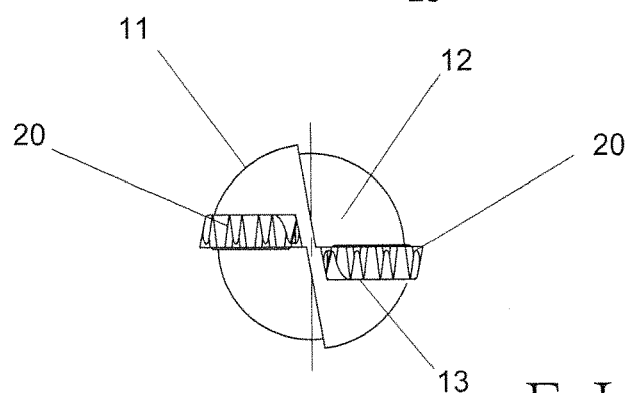
FIG. 3 is an end view of the disposable drilling and milling cutter in FIG. 1.

FIG. 1 to FIG. 3 show a disposable drilling and milling cutter 10 for use with an NC or CNC machine tool and designed to be fed spirally in order to drill and mill. The disposable drilling and milling cutter 10 includes a shank 11. One end of the shank 11 is provided with two chip removing grooves 12 which are offset in position with respect to each other. The distal end of each chip removing groove 12 is provided with a blade seat 13 to which a disposable blade 20 can be locked. A water outlet hole 14 is provided at the center of the shank 11 and is in communication with each of the chip removing grooves 12.

Each disposable blade 20 has a blade body 21 centrally provided with a conical through hole 22. The blade body 21 has two opposite ends each provided with a cutting edge 23. More specifically, the two cutting edges 23 are respectively formed at an upper end and a lower end of a top surface 211 of the blade body 21. Each cutting edge 23 has an irregular height and a plurality of notches 24 such that a wavy shape is formed. Each wavy cutting edge 23 includes a series of alternately arranged outward edge sections 231 and inward edge sections 232 (see FIG. 4). The end surface where each cutting edge 23 is located is provided with a flat surface 25 to be pressed against a side 131 of the corresponding blade seat 13.

As shown in FIG. 1 and FIG. 2, the water outlet hole 14 is provided at the center of the disposable drilling and milling cutter 10 so that a cooling liquid can be supplied during the cutting process. In this embodiment, in which two disposable blades 20 are provided, a spacing c exists between the inward edge sections 232 of the two disposable blades 20 that are closest to the center of the shank 11, so the disposable blades 20 cannot work by drilling directly downward. The cutter must be moved horizontally in order to mill the portion that is unable to be drilled due to the spacing c between the innermost inward edge sections 232 of the two disposable blades 20. It is therefore required that the disposable drilling and milling cutter 10 of the present invention be controlled by an NC or CNC machine tool and fed in a spiral manner so as to both mill horizontally and drill downward, thereby achieving the intended function of hole milling. In other words, the present invention uses a spiral feeding approach so that the cutter can mill in the horizontal direction and drill downward at the same time.

Figure 5:
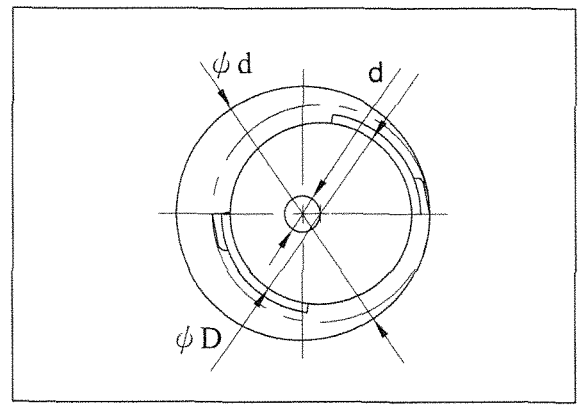
FIG. 5 is a top view showing a spiral drilling and milling operation of the disposable drilling and milling cutter in FIG. 1.
Figure 6:
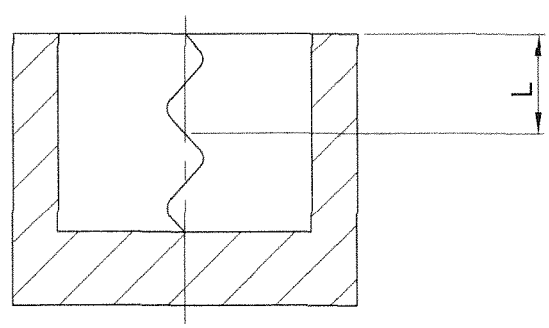
FIG. 6 schematically shows the lead achieved by spirally feeding the disposable drilling and milling cutter in FIG. 1.

The angle of the spiral feed is set as follows. Please refer to the lower wavy cutting edge 23 of the disposable blade 20 on the right-hand side of FIG. 4 for example, wherein the cutting edge 23 has an irregular height and the notches 24 mentioned above. A measuring line 30 is drawn tangent to a curve of the cutting edge 23 and extends through the adjacent notch 24. More specifically, the measuring line 30 is not steeper than passing through the center point of the adjacent notch 24 and, practically speaking, is typically drawn to pass through a point of the notch 24 that is a small distance outward of the center point of the notch 24. For example, the lead angle θ defining the spiral feed is set at 25.8°. In the embodiment shown in FIG. 5 and FIG. 6, the drilling and milling cutter 10 has a diameter ϕ D of 24 mm and is used to form a hole having diameter ϕ d of 28 mm by drilling and milling. In order to form the hole by drilling and milling, the center of the cutter must be rotated along a spiral path with a diameter d=28−24=4 mm. That is to say, referring to FIG. 1, FIG. 5, and FIG. 6, the center of the disposable drilling and milling cutter 10 is 2 mm away from the center of the hole to be formed while rotating along the ϕ 4-mm spiral path. Therefore, the lead L=πd×tan θ=4π×tan 25.8°=60.75 mm, which is the downward drilling depth of the disposable drilling and milling cutter 10 in one rotation (i.e., the process of milling the hole around its entire circumference once). On the other hand, the horizontal feed f is preset at 0.1 mm (see FIG. 4). Thus, when spirally driven, the disposable drilling and milling cutter 10 not only mills horizontally but also drills downward. It should be noted that, while the ϕ 24-mm drilling and milling cutter is illustrated here as making a ϕ 28-mm hole, ϕ 28 mm can be only the diameter to start with. The hole diameter can be further increased by using the same drilling and milling cutter. In order to achieve higher cutting efficiency, however, a larger drilling and milling cutter with larger disposable blades 20 is advised if a far larger hole is to be formed.

Figure 4:
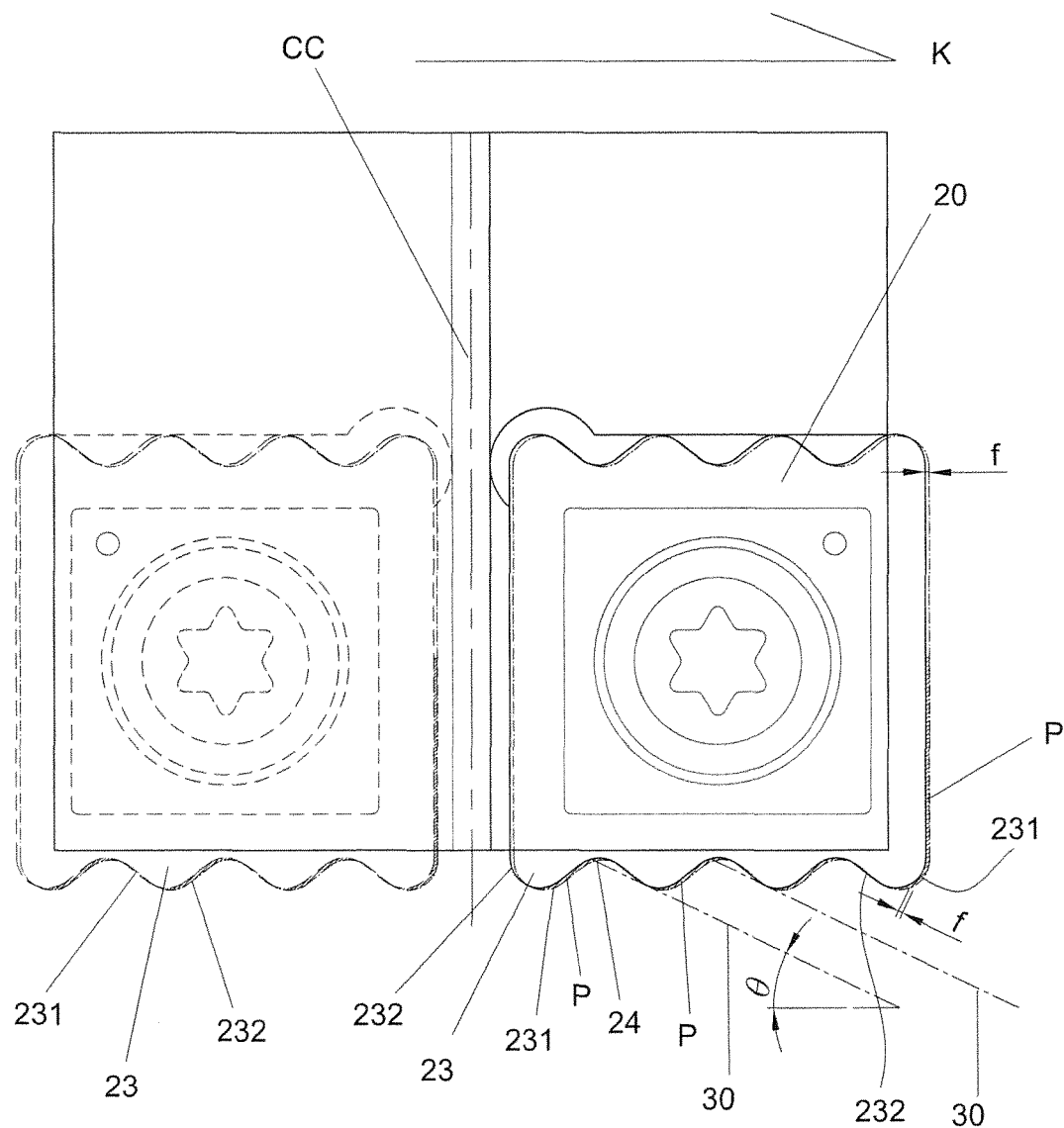
FIG. 4 is a schematic drawing of the disposable blades in the disposable drilling and milling cutter in FIG. 1, showing in particular how the lead angle is set and how the cutting edges are designed to cut in a sectioned manner.

A detailed description is given below with reference to FIG. 4 of how the cutting edges of the disposable blades drill and mill in a sectioned manner, how drilling/milling chips are cut, and how the drilling and milling process is carried out intermittently. In the foregoing example, the angle defined by the measuring line 30 (i.e., the lead angle θ) of each disposable blade 20 is 25.8°, and the horizontal feed f of each disposable blade 20 is 0.1 mm. When each disposable blade 20 drills and mills in the direction of the measuring line 30 (i.e., at the lead angle θ), the feed f in that direction (i.e., the amount removed by drilling and milling in that direction) is also about 0.1 mm. As shown in FIG. 4, when the direction K of the horizontal feed is toward the right, both blades drill and mill in a rightward and downward direction (i.e., at the lead angle θ), but taking the blade on the right for example, the actual cutting portions of the cutting edge 23 in action are the region that lies between each two adjacent measuring lines 30. In other words, for the blade on the right, it is the outward edge sections 231 of the lower cutting edge 23 that actually cut. The hatched areas P indicate the feed of each disposable blade 20 in one revolution. As the actual cutting portions of each cutting edge 23 in action during the drilling and milling process are separate from one another, a sectioned cutting effect is produced. When the blade on either side is viewed from the centerline CC of the disposable drilling and milling cutter 10, it can be found that the actual cutting portions of the working cutting edges 23 of the two disposable blades 20 are different. For the working cutting edge 23 on the right, it is the outward edge sections 231 that actually cut and mill, rather than the inward edge sections 232. As to the working cutting edge 23 on the left, it is the inward edge sections 232 (i.e., edge sections facing the centerline CC) that actually cut and mill, rather than the outward edge sections 231. After the cutter is rotated by 180°, each blade is rotated to the opposite side, and the actual cutting portions of the left and right disposable blades 20 are changed accordingly. Take the disposable blade 20 on the right-hand side of FIG. 4 for example. When this blade is on the right, the outward edge sections 231 of the lower cutting edge 23 are in charge of drilling and milling, and the inward edge sections 232 stop cutting. Once the blade is rotated by 180° to the left-hand side of FIG. 4, the inward edge sections 232 are in charge of drilling and milling while the outward edge sections 231 stop cutting. Therefore, during a drilling and milling operation, the inner or outward edge sections of the working cutting edge 23 of each disposable blade 20 are cutting only within one half (i.e., 180°) of a complete revolution and stop cutting in the other half of the revolution. Because of that, drilling/milling chips are automatically severed. Also, the relatively small edge sections produce relatively short and small drilling/milling chips which can be easily discharged from the cutter. Moreover, as the cutting edges 23 cut in a sectioned manner, heat dissipation from the cutting edges is more efficient than if the cutting edges cut with their full lengths.

Figure 7:
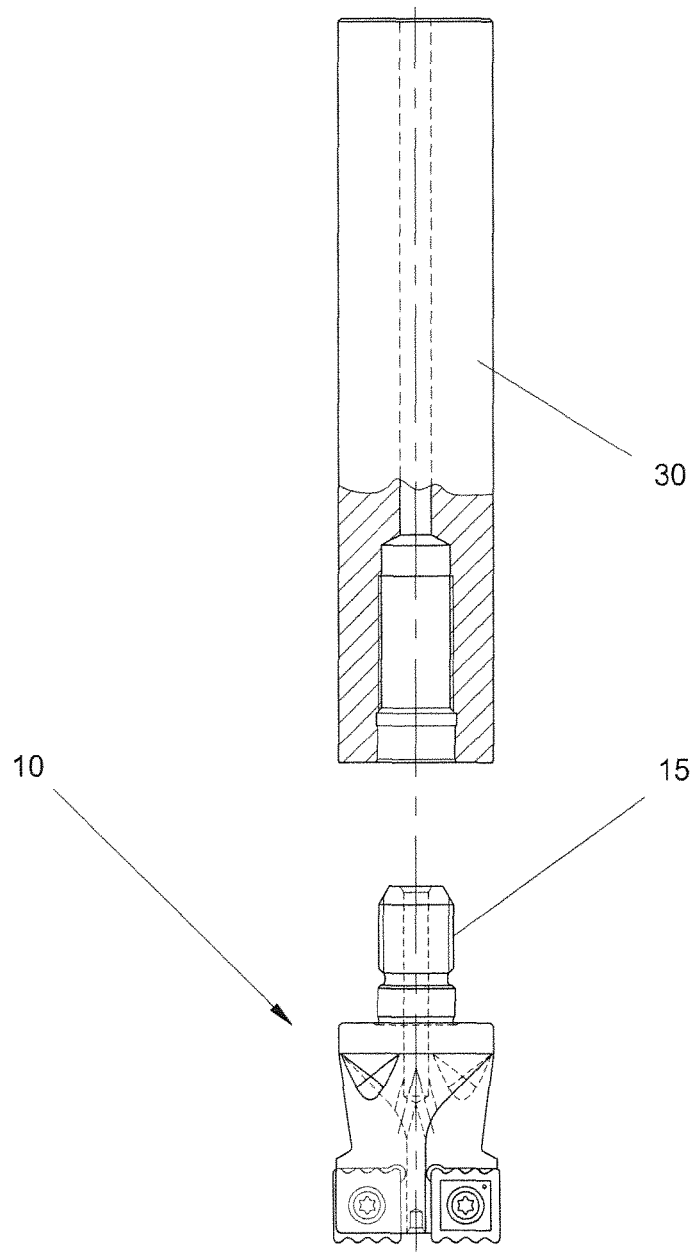
FIG. 7 schematically shows how the disposable drilling and milling cutter in FIG. 1 is increased in length by connecting with an extension rod.

FIG. 7 shows how the disposable drilling and milling cutter 10 is extended in length. One end of the disposable drilling and milling cutter 10 is provided with a connecting screw rod 15. The connecting screw rod 15 is configured for connecting with an extension rod 30 so as to increase the length of the disposable drilling and milling cutter 10. To enable chip removal, the diameter of the extension rod 30 is smaller than the diameter of the hole to be formed. The extension rod 30 also allows a cutting fluid to be injected into the center of the cutter so that chip removal, cooling, and heat dissipation can be achieved at the same time. The extension rod 30 of the present invention is made of a shock-resistant tungsten steel material. According to test results on drilling depth, the ratio of drill bit diameter to drilling depth (D/L) is at least 1:10, which is unprecedented in the cutter industry.

A conventional $\phi$ 28-mm drill bit and a $\phi$ 24-mm drilling and milling cutter according to the present invention are compared in terms of cutting amounts. The conventional $\phi$ 28-mm drill bit has a cutting speed Vc=80~150 m/min and a rotational speed N=$[1000\times(80\sim150)]/(\pi\times28)$=909.5~1705 rpm, and the feed of each cutting edge in one revolution is f=0.1 mm/revolution; therefore, the feed per minute is F=f×N×Z (number of cutting edges)=181.9~341 mm/min, meaning the cutting amount per minute is 181.9341 mm. On the other hand, the $\phi$ 24-mm drilling and milling cutter of the present invention has a cutting speed Vc=300 m/min and a rotational speed N=$(1000\times300)/(\pi\times24)$=3979 rpm, and the feed of each cutting edge in one revolution is f=0.2 mm/revolution (this relatively large feed is attributable to the sectioned and intermittent drilling/milling action and the chip breaking design); hence, the feed per minute is F=f×N×Z (number of cutting edges)=1591.6 mm/min. As the drilling and milling cutter is rotated along a spiral path with a diameter d of 4 mm, the number of rotations per minute is Nz=$1591.6/(\pi\times4)$=126.66 rotations/min, and the downward cutting (drilling) amount per minute is Fz=Nz×lead (L)=126.66×6.075=769.5 mm/min. The per-minute cutting amount of the drilling and milling cutter of the present invention is 4.23 (i.e., 769.5/181.9)~2.26 (i.e., 769.5/341) times as much as that of the conventional drill bit. In addition to higher cutting efficiency, the present invention advantageously features sectioned drilling/milling and automatic chip breaking such that the drilling/milling chips are short and small, can be easily discharged without getting stuck, allow efficient heat dissipation, and do not add to the cutting load. The service life of the drilling and milling cutter is therefore expected to increase manyfold as compared with those of its conventional counterparts. A further benefit of the present invention is that drilling and milling can be accomplished by a small cutter mounted on a small and light-duty machine tool.

Figure 8:
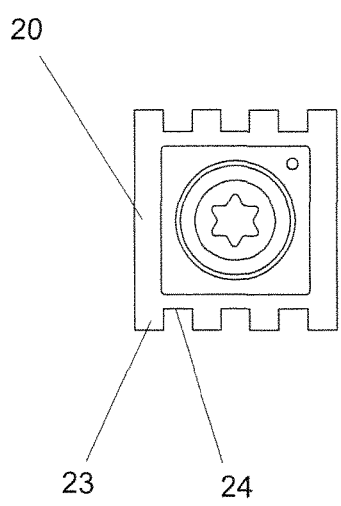
FIG. 8 schematically shows a disposable blade in another embodiment of the present invention, wherein the blade has rectangular notches.
Figure 9:
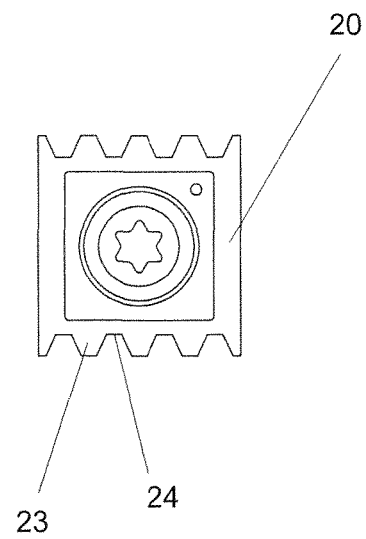
FIG. 9 schematically shows a disposable blade in yet another embodiment of the present invention, wherein the blade has trapezoidal notches.
Figure 10:
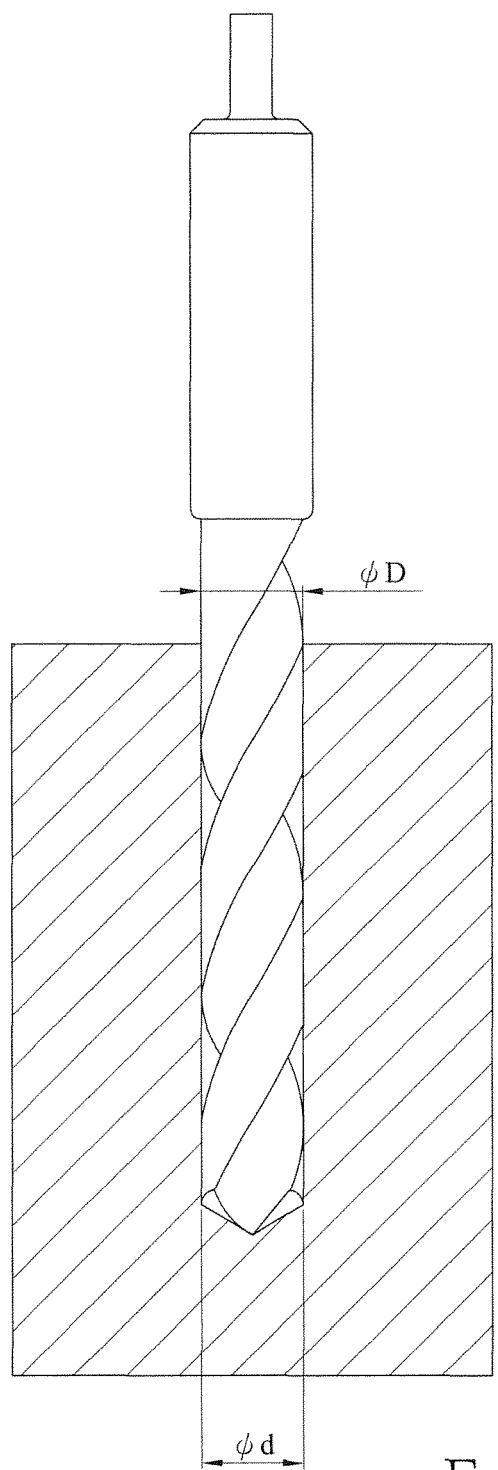
FIG. 10 schematically shows a conventional twist drill bit drilling a workpiece.
Figure 11:
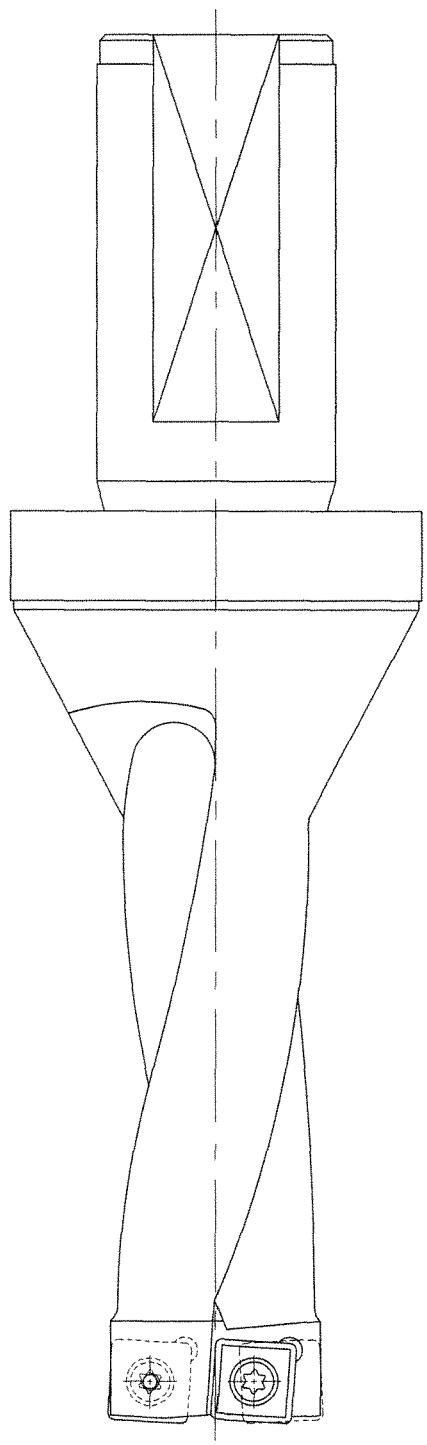
FIG. 11 schematically shows a conventional disposable drill bit.

The disposable blades of the present invention may have cutting edges of various shapes. For example, the cutting edges 23 of the disposable blades 20 in the embodiments shown in FIG. 8 and FIG. 9 have rectangular notches and trapezoidal notches 24 respectively, in addition to being wavy and having irregular heights. Cutting edges of other shapes are also contemplated.

In summary, the disposable drilling and milling cutter of the present invention is spirally driven and works with disposable blades with wavy cutting edges to achieve three-dimensional drilling and milling. A user can make holes of various sizes by the drilling and milling action of the same cutter and is thus spared the trouble of having to choose from drill bits of different specifications. Due to such special features of the cutting edges of the disposable blades as sectioned drilling and milling, automatic chip breaking, and intermittent processing, the resulting chips are short and small and can be readily removed without getting stuck. Consequently, efficient heat dissipation is made possible, and cutting resistance is kept from building up so that the cutter can rotate at higher speed and cut more efficiently than the conventional drill bits. Apart from that, the drilling and milling cutter can be adjusted in length by connecting with an extension rod, thereby freeing the user from limitations on the ratio of drill bit diameter to cutting depth (D/L). The structural design disclosed herein and the spiral feeding approach are groundbreaking improvements over the conventional drill bits and processing methods and are the first of their kind in the cutter industry, lending novelty and non-obviousness to the present invention.

The embodiments described above are only some preferred embodiments of the present invention and are not intended to be restrictive of the scope of patent protection sought by the applicant. All simple equivalent changes and substitutions made according to the appended claims and the present specification should fall within the scope of the present invention.

The invention claimed is:
1. A disposable drilling and milling cutter comprising:
  a shank;
  a chip removing groove provided at one of a plurality of offset positions at an end of the shank;
  a blade seat provided at a distal end of the chip removing groove; and
  a disposable blade locked to the shank with a bottom portion bearing against the blade seat, the disposable blade including a top portion offset from the bottom portion by an undulating side portion extending transversely therebetween, the top portion defining a cutting edge at each of an upper end and a lower end of the disposable blade, wherein at least one of the cutting edges has an irregular height and at least one notch disposed along the undulating side portion, and the undulating side portion defines at least one beveled flat surface extending from the bottom portion and terminating intermediately within the undulating side portion to be offset from the at least one cutting edge at the top portion;

wherein the disposable drilling and milling cutter works with a numerical control or computer numerical control machine tool and is fed in a spiral manner in order to drill and mill; the at least one of the cutting edges has a lead angle defining a spiral feed, and the lead angle is defined by a measuring reference line extending between a point tangent to a curve of the cutting edge and through the at least one notch adjacent thereto; and, the lead angle defining the spiral feed is 25.8°.

2. The disposable drilling and milling cutter of claim 1, wherein each of the cutting edges is provided at an end surface of the disposable blade, and each of the end surfaces is provided with the at least one beveled flat surface pressed against a side of the blade seat.

3. The disposable drilling and milling cutter of claim 1, wherein the at least one notch of the at least one of the cutting edges of the disposable blade is rectangular or trapezoidal.

4. The disposable drilling and milling cutter of claim 1, wherein the shank is centrally provided with a water outlet hole in communication with the chip removing groove.

5. The disposable drilling and milling cutter of claim 1, wherein the disposable blade has a blade body, and the at least one of the cutting edges is provided with a plurality of notches such that the cutting edge has a wavy shape and is formed with a series of alternately arranged outward edge sections and inward edge sections.

6. The disposable drilling and milling cutter of claim 5, wherein two said disposable blades are provided, and the inward edge sections of the two disposable blades that are closest to a center of the shank are spaced by a spacing.

7. The disposable drilling and milling cutter of claim 1, wherein the disposable drilling and milling cutter has an end provided with a connecting screw rod, and the connecting screw rod is connectable with an extension rod to increase a length of the disposable drilling and milling cutter.

8. A disposable drilling and milling cutter comprising:
a shank;
a chip removing groove provided at one of a plurality of offset positions at an end of the shank;
a blade seat provided at a distal end of the chip removing groove; and
a disposable blade locked to the shank with a bottom portion bearing against the blade seat, the disposable blade including a top portion offset from the bottom portion by an undulating side portion extending transversely therebetween, the top portion defining a cutting edge at each of an upper end and a lower end of the disposable blade;
wherein at least one of the cutting edges is irregular in height and notched,
wherein the undulating side portion includes a plurality of raised sections separated by notches therebetween and defines a plurality of beveled flat surfaces, each of the beveled flat surfaces extending along one of the raised sections from the bottom portion toward the top portion and terminating intermediately within the undulating side portion to be offset from the at least one cutting edge at the top portion, the beveled flat surfaces being separated from one another by one of the notches, and
wherein the at least one cutting edge has a lead angle defining a spiral feed, the lead angle being 25.8° and defined by a measuring reference line extending between a point tangent to a curve of the cutting edge and through an adjacent notch and the 25.8° lead angle not being steeper than where the measuring reference line passes through a center point of the adjacent notch.

9. The disposable drilling and milling cutter of claim 8, wherein the disposable drilling and milling cutter works with a numerical control or computer numerical control machine tool and is fed in a spiral manner in order to drill and mill.

10. A disposable drilling and milling cutter comprising:
a shank;
a chip removing groove provided at one of a plurality of offset positions at an end of the shank;
a blade seat provided at a distal end of the chip removing groove; and
a disposable blade locked to the shank with a bottom portion bearing against the blade seat, the disposable blade including a top portion offset from the bottom portion by an undulating side portion extending transversely therebetween, the top portion defining a cutting edge at each of an upper end and a lower end of the disposable blade, wherein at least one of the cutting edges has an irregular height and at least one notch disposed along the undulating side portion, the at least one of the cutting edges having a lead angle defining a spiral feed, and the lead angle being 25.8° and defined by a measuring reference line extending between a point tangent to a curve of the cutting edge and through the at least one notch adjacent thereto, and wherein the undulating side portion includes a plurality of raised sections separated by notches therebetween and defines a plurality of beveled flat surfaces, each of the beveled flat surfaces extending along one of the raised sections from the bottom portion toward the top portion and terminating intermediately within the undulating side portion to be offset from the at least one cutting edge at the top portion, the beveled flat surfaces being separated from one another by one of the notches;
wherein the shank is centrally provided with a water outlet hole in communication with the chip removing groove, and
the disposable drilling and milling cutter has an end provided with a connecting screw rod, and the connecting screw rod is connectable with an extension rod to increase a length of the disposable drilling and milling cutter, the extension rod including a shock-resistant tungsten steel material, the extension rod providing additional length to a drilling depth, the disposable drilling and milling cutter has a diameter wherein a ratio of the diameter and the drilling depth is at least 1:10.

* * * * *